(No Model.)
A. E. ARNOLD.
Fumigating Compounds.
No. 235,487.                    Patented Dec. 14, 1880.
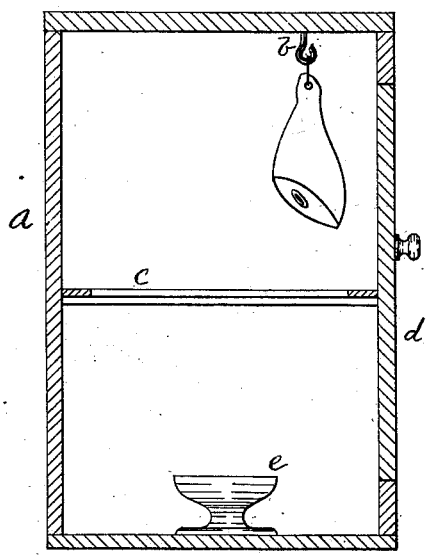
WITNESSES
Arthur Reynolds
V. D. Dearborn
INVENTOR
Mrs Ann Eliza Arnold
by Crosby Gregory Attys

United States Patent Office.

ANN ELIZA ARNOLD, OF PROVIDENCE, RHODE ISLAND.

FUMIGATING COMPOUND.

SPECIFICATION forming part of Letters Patent No. 235,487, dated December 14, 1880.

Application filed October 2, 1880. (No specimens.)

*To all whom it may concern:*

Be it known that I, ANN ELIZA ARNOLD, of Providence, county of Providence, State of Rhode Island, have invented an Improvement in Fumigating Compounds, of which the following description, in connection with the accompanying drawing, is a specification.

My invention relates to an improved fumigating compound for preserving meat, fish, fruit, and other food substances; and it consists in a mixture of sulphur, chloride of lime, and niter or potassium nitrate, which is burned in a tight receptacle, and the food substances subjected to the fumes thereof in said receptacle.

The food substance to be treated—such as meat and fish, or fruits, vegetables, &c.—are placed upon shelves or open trays $c$, or hung up by hooks $b$ in an air-tight closet, $a$, of suitable size and shape, according to the amount of material to be treated or preserved, said closet being interiorly accessible through a door, $d$, adapted to be closed air and gas tight.

The sulphur and potassium nitrate, in the proportions of about eight parts of the former to one of the latter, are placed in a chafing-dish or brazier, $e$, and heated, as by a spirit-lamp, moderately at first, and then more strongly until when they are brought to a state of perfect fusion they are ignited.

The fumes of sulphur or sulphurous acid, acting upon the meats and other food articles or substances, tend to arrest the decay, and act as a preservative, such action being well known as inherent in sulphur fumes.

The addition to the sulphur of the niter is very essential and important for the proper and full action and effect of the sulphur fumes, as it supplies or gives off oxygen to combine with the sulphur to form the sulphurous acid in sufficient quantities to completely fill the chamber. Ozone is also given out in the process with beneficial effect.

I prefer to use also in the chamber a small quantity of chloride of lime or bleaching-powder to dry the atmosphere and fumes therein, the chlorine given off thereby also having a marked antiseptic or preserving effect.

It is obvious that other substances—such as chlorate of potassa, black oxide of manganese, &c.—may be used instead of niter, the essential feature being that considerable quantities of free oxygen shall be readily given off to properly combine with the sulphur.

I am aware that fumes of sulphur and charcoal, and also that sulphur and alum, have been used in preserving processes; but they have required open or ventilated chambers to supply oxygen from the air to combine with the sulphur.

Water in a suitable vessel may be placed in this chamber and be subjected to the action of the gases arising from the burning sulphur and niter, and such water may be used as a liquid in which to place fruits or meats, it acting to preserve them, keep them sweet, and prevent decay.

I use also in the brazier a portion of chloride of lime about equal to that of niter, as this will, in the reaction, give off hypochlorous acid, which is a powerful antiseptic and preserving agent.

The material should be well mixed and constantly stirred while being heated and before it is placed within the chamber.

I claim—

The herein-described compound for preserving food substances by fumigation, consisting of a mixture of sulphur, chloride of lime, and niter.

In testimony whereof I have signed my name to this specification in the presence of two subscribing witnesses.

ANN ELIZA ARNOLD.

Witnesses:
G. W. GREGORY,
N. E. C. WHITNEY.